United States Patent [19]

Awakowicz et al.

[11] Patent Number: 4,593,158

[45] Date of Patent: Jun. 3, 1986

[54] TELEPHONE SUBSCRIBER STATION WITH A PIVOTABLY ATTACHED CHASSIS AND UPPER HOUSING

[75] Inventors: Erwin Awakowicz, Munich; Peter Kleine, Fischen, both of Fed. Rep. of Germany

[73] Assignee: Siemens Aktiengesellschaft, Munich and Berlin, Fed. Rep. of Germany

[21] Appl. No.: 594,088

[22] Filed: Mar. 28, 1984

[30] Foreign Application Priority Data

Mar. 30, 1983 [DE] Fed. Rep. of Germany ....... 3311705

[51] Int. Cl.⁴ .................................................. H04M 1/02
[52] U.S. Cl. ............................. 179/100 R; 179/100 D; 179/178
[58] Field of Search ............... 179/179, 178, 100 L, 179/100 R, 100 D, 146 R, 90 K

[56] References Cited

U.S. PATENT DOCUMENTS

| 2,186,078 | 1/1940 | Reid ........................ 179/179 |
| 2,348,592 | 5/1944 | Beardsley ................ 179/179 |
| 2,492,375 | 12/1949 | Boswau et al. ......... 179/179 X |
| 3,126,454 | 3/1964 | Fresk et al. ............. 179/100 D |
| 3,293,373 | 12/1966 | Lohs ....................... 179/100 D |
| 3,476,886 | 11/1969 | Ferrari et al. ............ 179/103 |
| 3,657,487 | 4/1972 | Schwank et al. ........ 179/100 R |
| 3,881,071 | 4/1975 | Willis et al. ............. 179/179 |
| 4,403,116 | 9/1983 | Prince et al. ............ 179/100 D |

FOREIGN PATENT DOCUMENTS

| 1174844 | 7/1964 | Fed. Rep. of Germany ...... 179/178 |
| 3048765 | 7/1982 | Fed. Rep. of Germany . |
| 1125011 | 8/1968 | United Kingdom ................ 179/179 |

Primary Examiner—Gene Z. Rubinson
Assistant Examiner—R. Vaas
Attorney, Agent, or Firm—Thomas H. Jackson

[57] ABSTRACT

A telephone subscriber station with a lower housing component on which there are pivotably mounted a chassis, which contains all the main components of the subscriber station, and the upper housing component. The chassis, which is mounted so that it is displaceable in the horizontal plane, is fixed in both the vertical and horizontal planes. For this purpose the upper housing component possesses a projection which, when the station is in the assembled state, presses on a spring-like lug of the chassis in the vertical plane. The chassis is also provided with an operating array which engages a recess in the upper housing component. By displacing the chassis in the horizontal plane it is possible to introduce the operating array into the correct position in the recess.

2 Claims, 2 Drawing Figures

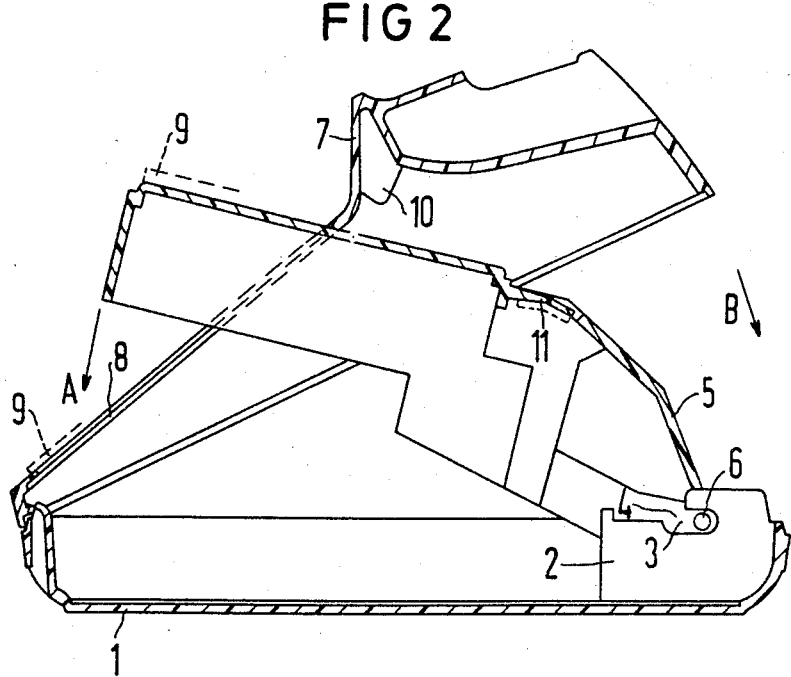

TELEPHONE SUBSCRIBER STATION WITH A PIVOTABLY ATTACHED CHASSIS AND UPPER HOUSING

BACKGROUND OF THE INVENTION

The present invention relates to a telephone subscriber station with a lower housing component on which a chassis is pivotably mounted. This chassis contains all the fundamental components of the subscriber station. An upper housing component attaches to the lower housing component so that the chassis is contained inside the two housing components.

Existing telephone subscriber stations contain an intermediate carrier which accomodates the main operating elements of the station, such as the keyboard, the name keying-in device, the loudspeaker, and the displays, and is pivotably mounted in the station housing to facilitate access to the individual components of the intermediate carrier in the event of servicing or alterations.

SUMMARY OF THE INVENTION

In the present invention the telephone subscriber station includes an upper housing component that is pivotably mounted on the lower housing component together with the chassis. In such a subscriber station the chassis must be aligned with the upper housing component so that when the subscriber station is assembled the aforementioned components are fixed relative to one another both vertically and horizontally.

It is possible to fix the chassis within the subscriber station housing in both the vertical and horizontal planes by providing the upper housing component with a projection, which, when the telephone subscriber station is in the assembled state presses upon a spring-like lug attached to the chassis; and the chassis is provided with an operating array which projects through an opening in the upper housing component where the chassis is mounted on the lower housing component such that it is displaceable in the horizontal plane.

The projection with which the upper housing component is provided and which for example is wedge-shaped at its free end acts upon the spring-like lug of the chassis when the chassis is fixed in the vertical plane, where production tolerances in this direction are compensated by the resilient lug. In order to compensate production tolerances in the horizontal plane the chassis is mounted so as to be displaceable in this plane. When the telephone subscriber station is assembled, first the chassis is suspended and pivoted in the direction of the lower housing component. Then the housing upper component is attached to the lower housing component and likewise pivoted in the direction of the lower housing component. Due to the fact that the chassis is mounted in such a way as to permit displacement in the horizontal direction, it can be displaced until the operating array of the chassis is arranged in the correct position within the opening of the upper housing component.

Other features and advantages of the present invention will become apparent from the following detailed description, and from the claims.

For a full understanding of the present invention, reference should now be made to the following detailed description and to the accompanying drawings.

BRIEF DESCRIPTION OF THE DRAWINGS

FIG. 2 is a cut-away side view of the chassis mounted between the upper housing component and the lower housing component of the telephone station, with both the chassis and the upper housing component shown rotated from their normal positions.

DETAILED DESCRIPTION

Figure 1:
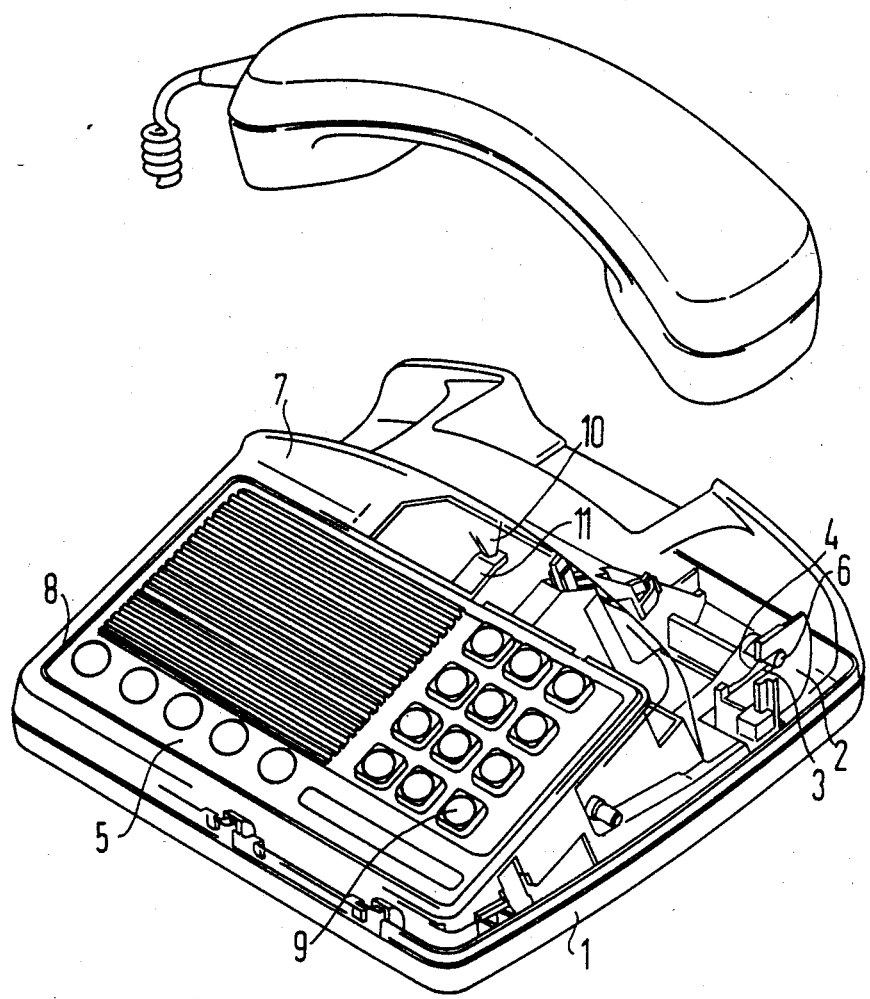
FIG. 1 is a perspective view of a telephone subscriber station wherein the components of interest located inside the station are clearly shown.

Referring to FIG. 1, the lower housing component 1 of a telephone subscriber station possesses crossmembers 2 running at right-angles to the plane of the lower component. In these crossmembers 2 are arranged slots 3 which run parallel to the plane of lower component 1 and which possess a partial interruption 4 in their zone facing away from lower component 1. Chassis 5, which includes all the main components of a telephone subscriber station, is provided with two pivots 6 which form a pivot axis and which engage in slots 3, and thus allow the chassis to be pivoted for the performance of servicing or repair work. On the front side facing towards the user, upper housing component 7 is pivotably mounted on lower housing component 1. Referring to FIG. 2, opening 8 in upper housing component 7 accomodates operating array 9 which is indicated by broken lines, and which for example, contains the dialing keyboard.

The telephone subscriber station is assembled by first suspending chassis 5 from the lower housing component, and pivoting it in the direction of arrow A towards lower housing component 1. Then upper housing component 7 is suspended from lower housing component 1 and pivoted in the direction of arrow B towards lower housing component 1. Operating array 9, with which the chassis is provided, thus projects through and slightly beyond opening 8 in upper housing component 7. Since the chassis is mounted in slots it can be displaced in the horizontal direction until operating array 9 is located exactly within the opening. This allows chassis 5 to be aligned relative to upper housing component 7 in the horizontal plane.

To fix the chassis in the vertical plane, upper housing component 7 is provided with projection 10 which is wedge-shaped at its free end, and which presses upon spring-like lug 11 of chassis 5 when components 1, 5 and 7 are assembled. The final connection of upper housing component 7 to lower housing component 1 can be effected for example, by screwing or locking these two components together.

There has thus been shown and described a novel telephone subscriber station with a pivotably attached chassis and upper housing which fulfills all the objects and advantages sought. Many changes, modifications, variations and other uses and applications of the invention will, however, become apparent to those skilled in the art after considering the specification and the accompanying drawings which disclose embodiments of the invention. All such changes, modifications, variations and other uses and applications which do not depart from the spirit and scope of the invention are deemed to be covered by the invention which is limited only by the claims which follow.

What is claimed is:

1. In a telephone subscriber station with a lower housing component on which there are a chassis, pivotably mounted for pivoting in one direction and which contains the main components of the subscriber station, and an upper housing component pivotably mounted for front to back pivoting in the opposite direction to the pivoting direction of the chassis, the improvement wherein the upper housing component includes a projection which presses upon a spring-like lug of the chassis and the chassis is provided with an operating array which projects through an opening in the upper housing component when the telephone subscriber station is in a fully assembled state, the chassis being mounted on the lower housing component so that it is displaceable in a horizontal plane of the station in a partially assembled state, the partially assembled state being when the chassis is pivotably mounted into a temporary horizontal position on the lower housing but the upper housing has not been pivotably rotated into position of the fully assembled state.

2. The telephone subscriber station of claim 1, wherein the projection is wedge-shaped, the wedge pointing in a direction toward the spring-like lug of the station in its fully assembled state.

* * * * *